United States Patent [19]
Scott

[11] 3,881,090
[45] Apr. 29, 1975

[54] ELECTRIC COOKING UTENSIL HAVING A REMOVABLE CERAMIC VESSEL

[75] Inventor: Robert J. Scott, Blue Springs, Mo.

[73] Assignee: Rival Manufacturing Company, Kansas City, Mo.

[22] Filed: Dec. 3, 1973

[21] Appl. No.: 420,951

[52] U.S. Cl. ............ 219/433; 219/424; 219/432; 219/436; 219/442; 219/535; 219/536
[51] Int. Cl. ........................................ F27d 11/02
[58] Field of Search ......... 219/424, 432, 433, 436, 219/438, 439, 441, 442, 535, 536

[56] References Cited
UNITED STATES PATENTS

| 1,597,241 | 8/1926 | Marsden | 219/442 |
|---|---|---|---|
| 1,895,212 | 1/1933 | Smith | 219/436 |
| 2,066,476 | 1/1937 | Lacy | 219/441 |
| 2,159,876 | 5/1939 | Lacy, Jr. | 219/441 |
| 2,235,911 | 3/1941 | Wilcox | 219/441 |
| 2,414,868 | 1/1947 | Gunther | 219/433 |
| 2,767,300 | 10/1956 | DeVerter | 219/424 X |
| 3,358,118 | 12/1967 | Mather et al. | 219/535 X |

FOREIGN PATENTS OR APPLICATIONS
793,381  11/1935  France ............... 219/438

Primary Examiner—Volodymyr Y. Mayewsky
Attorney, Agent, or Firm—Lowe, Kokjer & Kircher

[57] ABSTRACT

An electrically heated cooking utensil has a removable ceramic cup-shaped vessel for holding foodstuff. The ceramic vessel is retained in operative position by a metallic bowl shaped wall located interiorly of the cooking utensil. Electrically resistive heater wire is spiralled around the outwardly facing side of the retaining wall, within the channeled grooves of an adjacently attached compressive mounting unit. The mounting unit is held in place along the perimeter of the retaining structure by a spring in such a manner that automatic tension compensation is provided for in response to thermal expansion and contractions. The heater wires are encapsulated by glass fiber insulation thereby achieving electrical isolation.

2 Claims, 3 Drawing Figures

PATENTED APR 29 1975 3,881,090
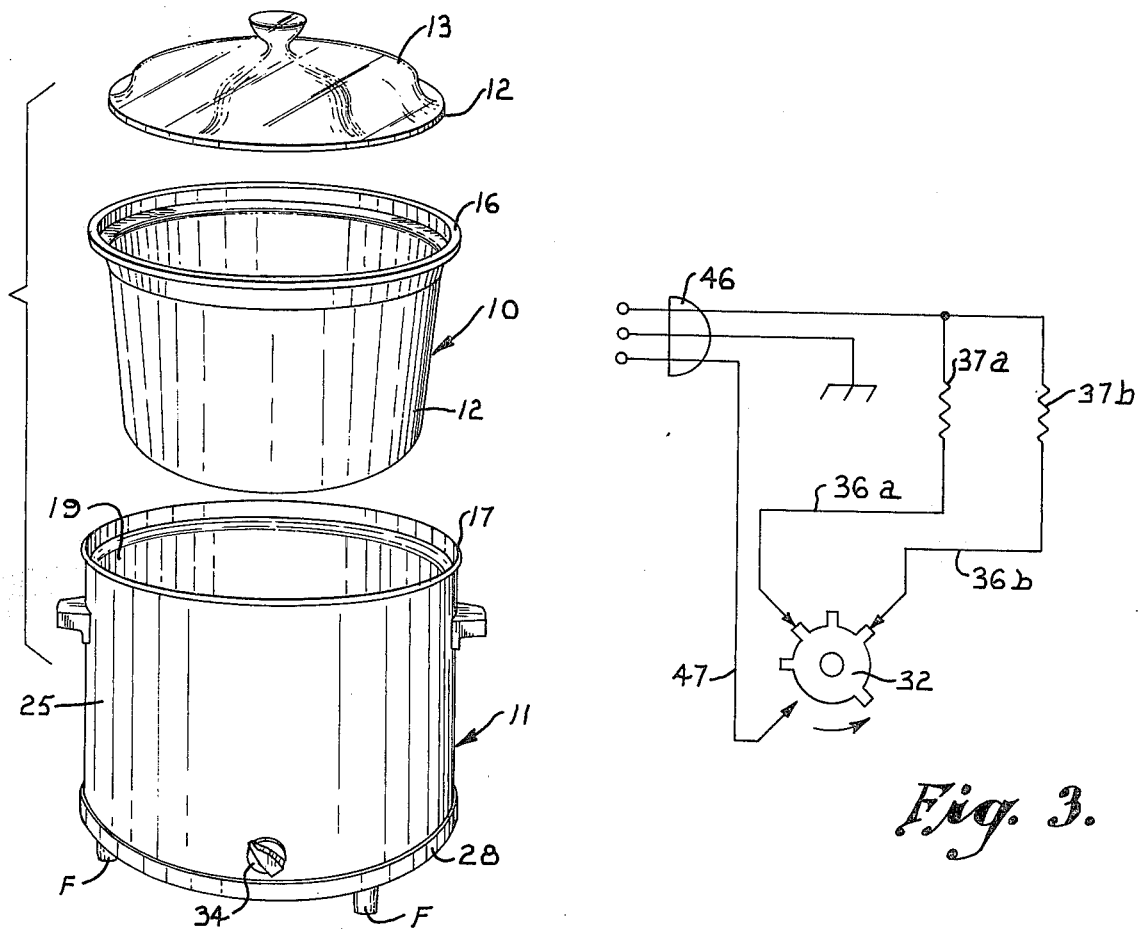
Fig. 3.
Fig. 1.
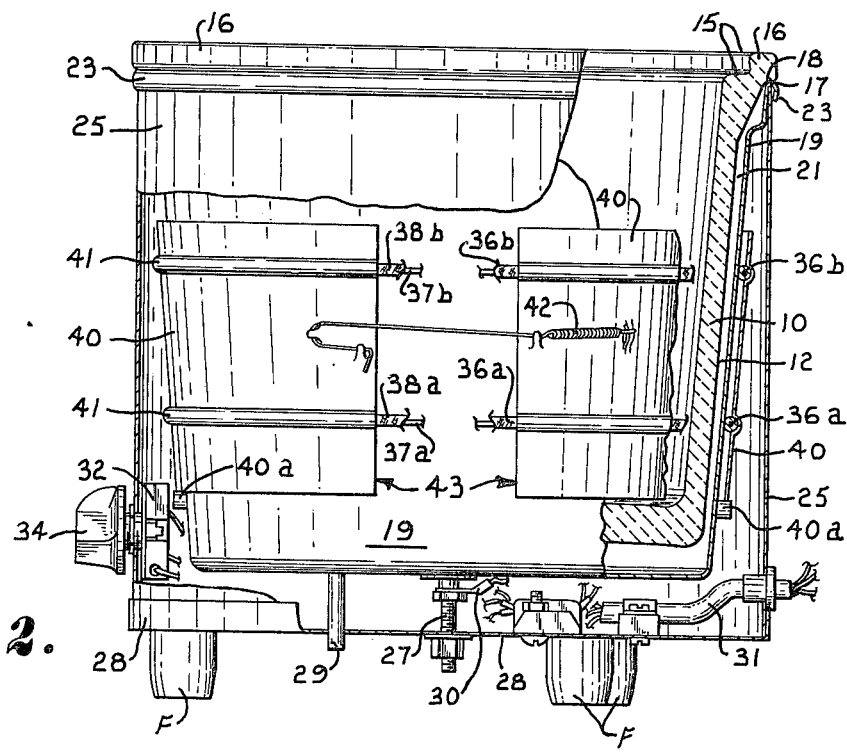
Fig. 2.

ELECTRIC COOKING UTENSIL HAVING A REMOVABLE CERAMIC VESSEL

BACKGROUND AND BRIEF DESCRIPTION OF THE INVENTION

Electric cooking utensils having heater wire wrapped about the outside of a vessel for the heating of foodstuffs contained therein are well known in the art. However, these devices are subject to various deficiencies.

If the ceramic utensil were to break it is possible that the user thereof could sustain serious electrical shocks if the foodstuff were to contact the "hot" electrical wiring. It is possible that even a small unseeen crack in the ceramic or earthenware container may allow enough seepage of liquid foodstuffs to create a dangerous electrical shock hazard.

Accordingly, it is a primary object of the subject invention to eliminate or reduce the potential electrical shock hazard in a non-thermostatically controlled electric cooking utensil which normally results when the earthenware vessel breaks. The heater wires are encased in a separate metallic wall which is separate from the earthenware vessel. The metallic wall is electrically insulated, and if the vessel were to break or develop a small unseen crack, resultant liquid seepage would not result in a shock hazard. In fact, with the subject invention, the liquid is precluded from entirely contacting the heater wires. This feature is further enhanced by a substantially liquid proof seal that is formed by the upper portion of the inner metallic container and the wall of the outer container of the utensil.

In the prior art, thermally induced expansions and contractions of the heater wires will promote the susceptibility of the earthenware vessel to cracking or deteriorating, because of the physical contact of the wire. Also, since the wire is glued or otherwise fixedly attached to the earthenware vessel, expansions or contractions of the wire itself may ultimately result in a deterioration of the heater circuit as the wire consequently may break or become loose.

It is a further object of the subject invention to avoid the preceding difficulties through the utilization of a unique heater wire attachment means. As mentioned previously, the heater wires are not wound around the earthenware vessel, so that the vessel itself will not be subject to the strains of expansions or contractions thereof. The wires are encapsulated by glass fiber insuation and are held in place about the outer surface of the separate metallic wall within the grooves in an independent mounting unit. A spring connects the ends of the heater wire mounting unit so as to compensate for expansions and contractions. Varying spring tension thus insures that the wires will adjustably be held within the circumferential grooves of the mounting unit.

Another object of the subject device is to provide an electric cooking utensil having an earthenware vessel which may easily be washed and cleaned. Since no wires are attached to the earthenware vessel removability is allowed and washing may thus be accomplished by completely immersing the earthenware vessel in water. The vessel itself is completely waterproof since it is glazed on both sides. Prior art devices are not immersible in water because damage to the electrical circuitry would likely occur, and cleaning of the cooking surfaces thus becomes difficult.

It is yet another object of the subject invention to provide an electric cooking utensil having an easily replaceable earthenware vessel. If the cooking vessel should break no damage will occur to the heater, and the user may simply insert a replacement vessel. In prior art devices however, breakage of the earthenware vessel will necessitate expensive and time consuming factory repair. This is avoided by the aforementioned construction.

It is yet another object of the subject invention to provide an electric slow cooking utensil in which the possibility of the contents thereof being inadvertently burned is substantially minimized. In prior art devices having the heater wires attached directly to the exterior surface of the cooking vessel "hot spots" will develop along the heater wire region. Food contacting these areas may be burned under certain conditions. In the subject invention the heater wires are attached to a separate metallic wall. Between the other side of this metallic wall and the outer surface of the earthenware cooking vessel is an air pocket or chamber, which facilitates the uniform distribution of heat to the vessel. The vessel is thus uniformly heated and hot spots which may operate to burn the contents thereof are avoided.

It is yet another object to provide an electric slow cooking non-thermostatically controlled utensil which is particularly suited for the slow cooking of foodstuffs. The utilization of the aforementioned construction in which an air pocket or chamber operates to uniformly distribute heat is particularly suited to slow cooking applications. Slow cooking operations are particularly vulnerable to burning from "hot spots", which, as mentioned, are eliminated in the subject design.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith, and in which like reference numerals are employed to indicate like parts in the various views;

FIG. 1 is an exploded view of the device showing the top, the earthenware vessel, and the enclosure means;

FIG. 2 is a sectional and fragmentary view of the cooking utensil; and

FIG. 3 is a schematic diagram of the electrical wiring utilized by the subject device.

In FIG. 1, numeral 10 depicts a glazed earthenware cooking vessel that removably fits within the metallic shell (or outer container) structure 11 and which has a lid 13 removably located thereon. The outer edge 12 of the lid will engage circumferential inner surfaces 15 of lip structure 16 in vessel 10, thereby locating the lid. A bowl shaped metallic inner container 19 is positioned within the shell 11 with its upper circumferential edge 17 contacting the outside circumferential edge 18 on the underside of lip 16 on vessel 10. In this manner vessel 10 is located and retained within the metallic shell 11. It is significant to note that the only physical connection between the vessel 10 and the shell 11 occurs at the interface of edges 17 and 18 and that elsewhere an inner air chamber 21 (FIG. 2) separate wall 19 from the earthenware vessel.

As seen in FIG. 2, inner container 19 has an upper portion 23 that is crimped around the top of shell wall 25 to hold container 19 in place. This crimped portion also precludes liquid from entering the area where the later described heater wires are located during the normal and expected use of the utensil. Bolt 27 depends from the bottom of the inner container 19 and serves to further retain same by its connection to shell bottom 28. Pin 29 extends from the bottom of container 19 through wall 28 to thereby prevent container 19 from rotating with respect to shell 11. Bolt 27 also has solderless connector 30 mounted therethrough which facilitates the grounding of metallic structure 19 and the metal shell walls 28 and 25 to further significantly reduce electrical shock hazards. Finally, feet F support the entire unit in the usual manner.

Electrical current enters the device through cable 31, and is delivered via switch 32 to one or both of the heater wires, which are generally indicated at 36a and 36b. The rotary knob 34 actually facilitates the switching operation as indicated in FIG. 3. The heater wires are comprised of electrically resistive conductors 37a and 37b which are encapsulated by vinyl or silicone insulation 38a and 38b. The heater wires are located exteriorly of the substantially vertical wall of container 19 within grooves 41 which form a portion of the generally cylindrical heater wire mounting unit 40. This heater wire mounting unit serves to compressively retain and locate the wires against the side wall of the container 19.

It is to be noted that the disclosed construction is facilitated by the utilization of suitably insulated heater wire such as that which is commercially available from Springfield Wire, Inc., of Springfield, Mass., and which is described in a Sale Bulletin entitled "Springfield Wire," and printed in the U.S.A. in Oct., 1969.

Heater wire mounting unit 40 does not extend completely around the circumference of container 19. A spring 42 extends through the gap 43 between the ends of the mounting unit and holds same in place by the exertion of pressure. Also, the lower edge of unit 40 rests upon pins 40a which extend horizontally from container 19. This construction enables the mounting unit to compensate for thermally induced expansion of the heater wires and container 19 since the spring 42 will expand when necessary and at the same time maintain sufficient pressure on the mounting unit to insure appropriate heater wire position. If the heater wires were simply glued to the surface of wall 19, for example, thermal expansion could destroy the glued interface, ultimately causing the heater wires to detach and fall toward the inner bottom of the cooking utensil.

In operation, heat generated by the heater wires is conducted by adjacent wall 19 into the inner chamber 21. This causes a mass of hot air of substantially uniform temperature to contact the surface 12 of the earthenware vessel 10, and heat is conducted therethrough to accomplish the cooking of foodstuffs within the vessel.

It is to be noted that the utilization of the air pocket virtually eliminates the hot spots which are characteristic of devices having heater wires attached directly to the cooking vessel. Since the construction as shown lessens the likelihood of hot spot burning of foodstuffs, it is particularly adapted for slow cooking operations.

The circuit as shown in FIG. 3 discloses the electrical circuitry utilized in the subject device. The center conductor of plug 46 is grounded as shown to the metallic inner container to guard against shock hazards. When switch 32 is rotated counterclockwise one position, wire 47 will be electrically connected to heater wire 36a thereby generating heat in the distributed resistance 37a. When rotated an additional position, wires 36a and 36b will both be electrically connected to conductor 47 and both heater elements will be working. The latter position corresponds to the "high" setting of switch 34.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An electric non-thermostitically controlled cooking utensil for slow cooking or warming food, said utensil including a vessel comprised of ceramic or earthernware material, said vessel having an annular lip located at the upper end portion thereof and extending radially outwardly therefrom, said vessel further including a generally cylindrical side wall integrally formed with said lip and a bottom wall, an inner container constructed of material having the ability to conduct heat and having a shape similar to said vessel and sized to permit at least a portion of said vessel to be received within said inner container, the inner container being substantially separated from said vessel by an air chamber located therebetween, at least one electric heating element operable to supply heat to the utensil contents by heating said inner container, said inner chamber and said vessel, said heating element encircling said inner container and being attached to the exterior surface of said inner container and electrically insulated therefrom, an outer container being of a size and shape to hold substantially all of said inner container and said vessel therein, said inner container having an upper end portion forming a seal with said outer container, said seal thereby precluding liquid located interiorly of said vessel from reaching said electric heating element while pouring out the contents of said vessel or in the event of said vessel becoming cracked or broken, said lip of said vessel contacting said seal and supporting substantially the entire weight of said vessel thereon in spaced relationship from said inner container so that neither said side wall nor said bottom contacts said inner container, said vessel structure including said lip permitting said vessel to be easily removed from said container without removing any other portions of the utensil or using special tools, attaching means for securing and attaching said heating element to the exterior surface of said inner container, and electric lead means for applying electric current to said electric heating element thereby effecting the heating of said heating element.

2. The combination as in claim 1 wherein said heating element attaching means includes a cylindrical mounting having a circumference less than said inner container, the mounting unit having ends connected by a spring member, said spring member operable to resiliently secure and locate the mounting unit on said inner container while at the same time compensating for thermally induced expansions or contractions of said mounting unit.

* * * * *